May 22, 1934.  F. H. LEWIS  1,959,921
WASHER
Filed Nov. 5, 1930   3 Sheets-Sheet 2
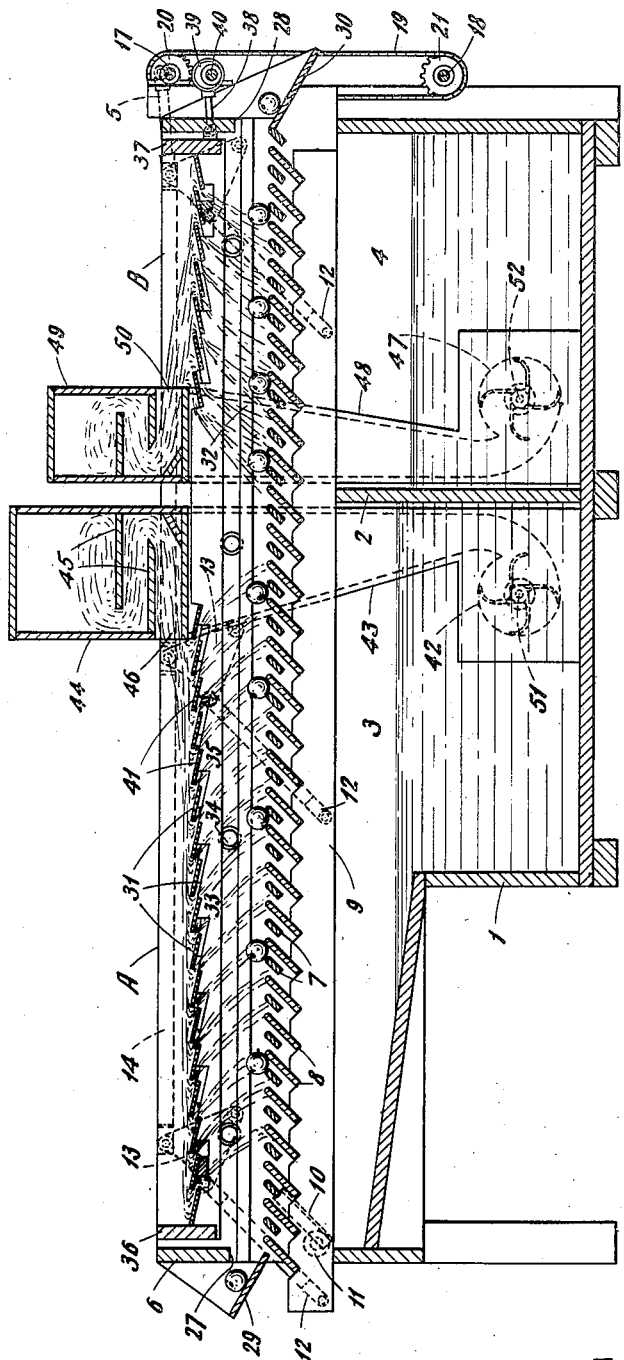
FIG_2.
INVENTOR.
Frank. H. Lewis.
BY
Philip A. Minnis
ATTORNEY.

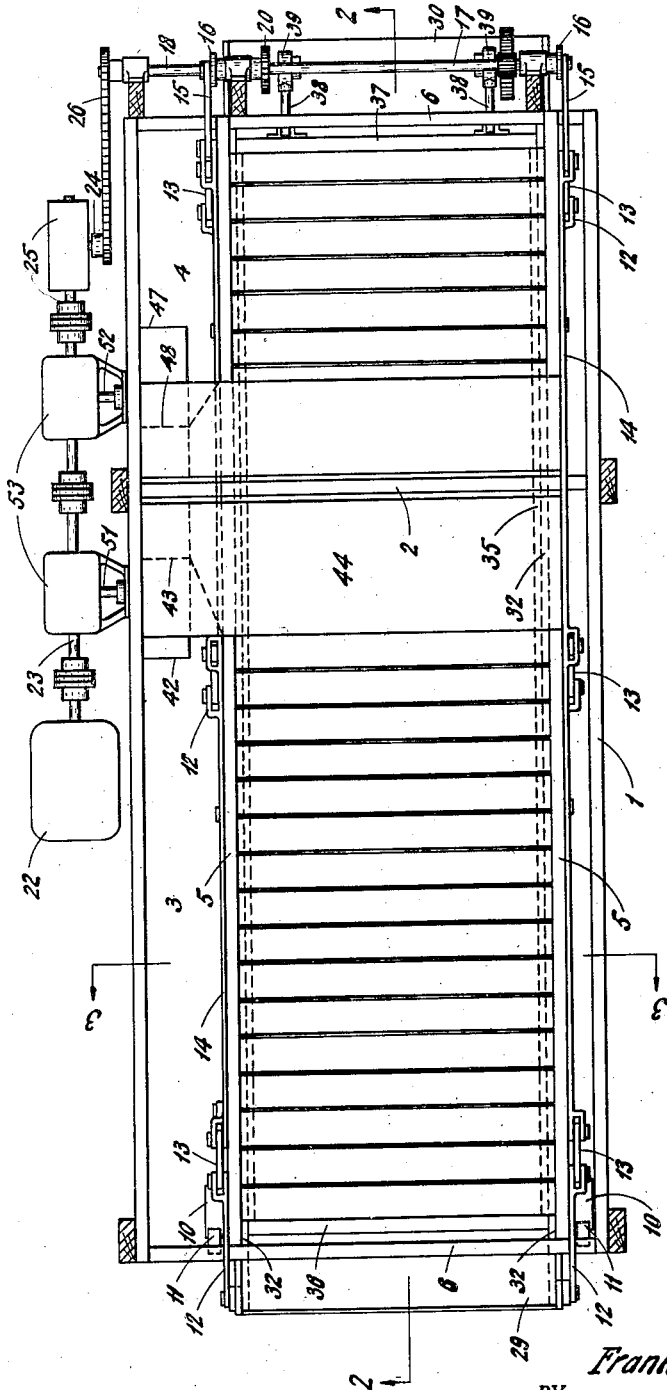

May 22, 1934.  F. H. LEWIS  1,959,921
WASHER
Filed Nov. 5, 1930  3 Sheets-Sheet 3
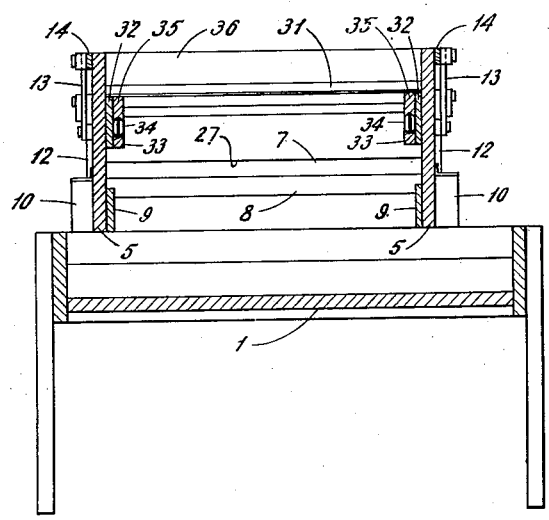
FIG_3.
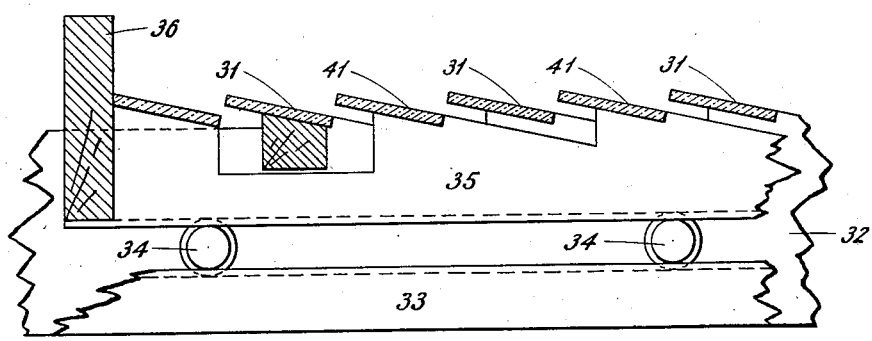
FIG_4.
INVENTOR.
Frank H. Lewis.
BY Philip A. Minnis
ATTORNEY.

Patented May 22, 1934

1,959,921

UNITED STATES PATENT OFFICE 1,959,921

WASHER

Frank H. Lewis, San Jose, Calif., assignor to Food Machinery Corporation, San Jose, Calif., a corporation of Delaware Application November 5, 1930, Serial No. 493,579

14 Claims. (Cl. 146—200)

This invention relates to washing apparatus and has particular reference to an apparatus of this nature, adapted to wash fruits and vegetables after they are picked and preparatory to marketing the same.

As is well known in the art, it is the general practice to spray fruit during its growing period with suitable insecticides or the like, in order to protect it against the attacks of insects and certain fungus growths and this treatment may be applied several times before the fruit is picked. Frequently it becomes necessary to apply the spray to more or less mature fruit and in order to be effective, it must be of a character adapted to adhere to the fruit as tenaciously as possible; unless, therefore, it rains after the spray has been applied, practically all of the spray material still adheres to the fruit after it is picked. Even if it does rain, it seldom, if ever, washes away enough of the spray residue to satisfactorily clean the fruit.

Most of the spray materials in general use at the present time are poisonous to humans as well as insects and it has been found to be necessary to thoroughly wash the fruit before consumption, in order that the spray residue adhering to the fruit shall be eliminated or reduced in amount to a sufficient degree to avoid any deleterious or undesirable effects.

One of the most effective types of fruit washers comprises a liquid tank having a bottom composed of spaced slats so arranged that the washing liquid passes through the openings between the slats and cascades down upon the fruit which is carried along underneath the tank on a suitable conveyor so that the fruit is deluged with streams of washing liquid. The washing liquid is generally a dilute acid solution which is too expensive to waste so that it is the customary practice to use the same liquid over and over again. For this purpose a receiving tank is disposed beneath the conveyor to catch the washing liquid after it has passed over the fruit and a suitable pump serves to pump the liquid back into the upper liquid tank from whence it again falls upon the fruit passing beneath it.

In the operation of fruit washers of the type just described, considerable difficulty is often experienced due to the clogging of the spaces between the slats which form the bottom of the upper liquid tank, with the result that the outflow of washing solution ceases and consequently fruit passing through the machine is not washed. Moreover, the liquid pumped to the overhead tank accumulates therein until it overflows, thus wasting the solution and causing a sloppy condition around the apparatus. This clogging of the bars is caused by the accumulation of leaves, twigs, dirt and other debris which is unavoidably carried into the machine along with the fruit.

It is the principal object of my invention to provide in a washing apparatus of the type referred to, means for preventing the clogging of the liquid outlets above the fruit, regardless of the amount of debris which may accumulate in the machine during the operation.

It is a further object to provide a mechanism for preventing the clogging of the liquid outlets which shall not affect the rate of flow of liquid on to the fruit, and which shall be simple in construction and easily operated.

These, and other objects and advantages will become more apparent as the description proceeds in connection with the accompanying drawings in which:

Fig. 1 is a plan view of a washing apparatus embodying a preferred form of my invention.

Fig. 2 is a sectional view taken along the line 2—2 of Fig. 1, looking in the direction of the arrows.

Fig. 3 is a section along the line 3—3 of Fig. 1.

Fig. 4 is a detail drawn to a considerably larger scale, illustrating the manner in which the fixed and movable slats cooperate so as to be self-cleaning while at the same time maintaining the rate of liquid flow constant.

Referring to Figs. 2 and 3, it will be seen that the apparatus comprises an open topped liquid tank 1, provided intermediate its ends with a transverse partition 2, which divides it into two sections 3 and 4, the former of which is adapted to contain a washing solution, (for example dilute hydrochloric acid), and the latter of which contains a rinse liquid. Resting upon the upper edges of the tank 1 and directly thereover, in lengthwise direction, is a box-like structure comprising the side walls 5 and the end walls 6, in the lower part of which is mounted a suitable conveyor, which, in the present instance, is composed of a series of obliquely disposed, alternately fixed and movable bars. The bars 7 extend crosswise of the apparatus and are rigidly secured at each end to one of the side walls 5. A second set of crossbars 8 are obliquely disposed in the interstices between the fixed bars 7 and are similar thereto except that they are adapted to be reciprocated. The top surfaces of all the bars are set at an angle in order to aid the advance of fruit thereover.

The reciprocating bars 8 are mounted upon suitable supporting rails 9 to which they are secured in any desired manner so that they all move in unison. The path of reciprocation of the bars is determined by the inclination of a pair of tracks 10, one of which is disposed adjacent each rail 9 at one end of the apparatus and upon each of which rides a roller 11 mounted on the outside of the corresponding rail. The rails 9 are supported and operated by rods 12 which have their lower ends pivotally secured thereto while their opposite extremities are pivotally connected to bell cranks 13. The bell cranks on each side of the apparatus are connected together by the connecting bars 14 which are reciprocated by the connecting rods 15, driven from crank discs 16, positioned on opposite ends of the driven shaft 17. Shaft 17 is driven from the shaft 18 by means of the chain 19, passing over sprockets 20 and 21. An electric motor 22 drives shaft 23 which drives shaft 24 through reduction gears located in the housing 25. A chain 26, passing over suitable sprockets on shafts 18 and 24 imparts rotation from shaft 24 to shaft 18.

The end walls 6 are cut away at 27 and 28 as shown, to provide an entrance and exit respectively for the fruit which is fed into the machine by way of the feed hopper 29. The fruit thus projected on to the conveyor through the entrance 27 rolls into the valleys between the fixed cross-bars 7 and as the reciprocating bars 8 are elevated, each piece of fruit is lifted out of the valley wherein it rests and over the next intervening fixed bar into the next valley where it rests until the bars 8 are again elevated, whereupon it is again advanced. In this manner, the fruit is advanced through the machine step by step and rolled over and over as it is advanced, thus insuring thorough washing of all sides. The washed fruit is discharged out through the opening 28 on to the discharge chute 30.

Located directly above the conveyor are a plurality of transversely disposed slats 31 which extend between the walls 5 and have their ends supported upon ledges formed by longitudinal strips 32 secured to the inner faces of the walls 5. The upper edges of the strips 32 are serrated as shown, and the upper edge of each tooth is cut away to form a bed for an end of a slat 31. Secured to the lower portions of the strips 32 are additional strips 33 having grooved upper edges forming a raceway in which a plurality of anti-friction discs or rollers 34 are adapted to roll and which support a movable rectangular frame comprising the side members 35, having grooved under edges adapted to rest upon the discs 34 and the end members 36 and 37.

It will be seen that the discs 34 form roller bearings for the side members 35 of the rectangular frame and the frame is adapted to be reciprocated upon these bearings by means of the connecting rods 38 attached at their inner ends to the end member 37 and passing through the wall 6, so that their outer ends can be attached to eccentrics 39, operated by the shaft 40. The side members 35 of the movable frame are serrated in a manner identical with the strips 32 and serve to support a second set of transverse slats 41 which are movable therewith. The serrations of the members 35 are so located, however, that they are in staggered relation to the serrations of the strips 32, so that a movable slat 41 is positioned intermediate each pair of stationary slats 31.

It will now be apparent that a slatted flooring is provided above the conveyor, comprising a series of alternately fixed and movable transversely disposed slats arranged in echelon, having interstices there-between, the fixed slats being supported upon the supporting strips 32, and the alternately arranged movable slats being supported upon the side members 35 of a movable frame or carriage resting upon the roller bearings 34.

The result of this construction is that as the slats 41 are moved with respect to the fixed slats 31, alternate interstices between the slats are widened so as to allow for the passage therethrough of any material which may have been clogging them. Simultaneously therewith, however, the remaining interstices are narrowed in the same proportion that the others are widened, with the result that the total area of the openings between the slats remain constant at all times. As the slats 41 are now moved back in the opposite direction, the widened interstitces are narrowed while the narrowed ones are widened, and this process is repeated during the operation of the machine so that the interstices are constantly being freed of any clogging material.

It will be noted that the slats are mounted on an inclined position and that those over the washing section are inclined in an opposite direction to those over the rinsing section. The reason for this is to secure proper distribution of the liquid over the slats. The upper portion of the washer is divided into two distributing tanks generally indicated at "A" and "B", corresponding to the lower tanks 3 and 4 respectively. The tank "A" is supplied with washing solution from the tank 3 by means of the pump 42, having its intake in communication with the tank 3 and which pumps the solution upwardly through the pipe 43, into the header 44, from whence the solution issues into a tank "A". The header 44 is provided internally with longitudinal baffles 45 extending from the pipe 43 for the entire length of the header but being of a width somewhat less than the width of the header so as to form a tortuous path for the liquid passing therethrough. A comparatively narrow discharge opening 46 in the header extends entirely across the width of the tank "A". By this construction, the liquid supplied to the header is caused to be distributed evenly throughout its length, and discharged with considerable force in a sheet across the entire width of the distributing tank "A". It will be seen that if the slats were inclined upwardly toward the header outlet, the tendency would be for the greater part of the liquid to flow through the first few openings and comparatively little liquid would reach the last ones. By inclining the slats upwardly, away from the header outlet, this tendency is overcome and the liquid spreads evenly over the slats so that substantially the same quantity passes through each opening.

The construction and operation of the distributing tank "B" for rinsing liquid and its supply is the same as that of tank "A" just described. The pump 47 withdraws liquid from the tank 4 and delivers it through the pipe 48 to the header 49, provided with an outlet 50, from which the rinsing liquid issues into the tank "B". Since this header discharges in an opposite direction from the header 44, the slats comprising its floor are inclined in a direction opposite to those in the tank "A".

Pumps 42 and 47 are mounted on suitable shafts 51 and 52 driven from shaft 23 by means of gears (not shown), located in housings 53.

All the slats are preferably formed of glass, since this material is impervious to acid and the glass can easily be cut so as to leave sharp, knife-like edges which aid the cleaning action. It has been found that leaves and grass, when passing over the sharp edges of the slats are often cut up into smaller pieces so that they are less liable to clog the openings if again introduced into the distributing tank by the circulating liquid.

In operation, the fruit to be washed is fed onto the conveyor through the feed hopper 29 and as the movable bars 8 are reciprocated, the fruit is advanced step by step, being rolled over and over so that all parts of its surfaces are presented to the streams of washing solution which pours down upon the conveyor from the slatted floor above. As the solution passes over the fruit it effectively cleans it, the solution passing through the conveyor and falling into the tank 3, carrying the dirt with it. This liquid is now withdrawn from the tank 3 and forced upwardly into the header 44 from whence it issues into the tank "A", being evenly spread over the slatted floor by reason of the obliquely disposed slats.

Since dirt and debris is continuously washed off the fruit into the tank 3, some is pumped up into the distributing tank "A" where it may be caught in the openings between the slats. The slats 41, carried upon the reciprocating side members 35 are constantly shifted back and forth so that each opening between the slats is alternately widened and narrowed. Moreover, as one group of openings are widened so as to release any debris which may have lodged therein, alternate openings are narrowed in the same proportion so that the rate of outflow through the slatted floor remains constant. This feature has a most important bearing upon the successful operation of the washer, since if the head of water on the slatted floor is lost, the operation is unsatisfactory. As the liquid is supplied to the distributing chamber at a constant rate, the outflow must also be at the same rate. If the area of the openings should be increased, the solution issuing from the header would not evenly cover the entire floor with the result that fruit would be washed over a portion only of its path which would be insufficient to clean it.

As the fruit advances it passes through the washing section under the rinsing liquid flowing from the distributing tank "B" and is thoroughly rinsed so that no traces of acid, spray material or dirt are left thereon. The construction and operation of the rinsing section are the same as the washing section so that it is believed that the operation is apparent without further description. The fruit, after it has been washed and rinsed is discharged out through the discharge opening 28 into the discharge chute 30.

It will be understood that apparatus embodying my invention is not limited to the washing of fruit but may be used for washing any articles. It is also apparent that many changes and modifications may be made without departing from the spirit of the invention and I regard myself as entitled to all such changes and modifications as fall within the scope of the claims hereto appended.

Having now described my invention and in what manner the same may be used, what I claim is new and desire to secure by Letters Patent is as follows:

1. In a washing apparatus, a distributing tank, supporting members fixed to opposite sides of the tank, a plurality of obliquely disposed slats resting upon the supporting members, raceways for anti-friction bearings fixed to the sides of the tank beneath said supporting members, antifriction bearings carried by the raceway, a movable frame in said tank having side members adapted to rest upon said bearings, a plurality of obliquely disposed slats carried by the side members and arranged in staggered relation to said first named slats, and means for reciprocating said frame.

2. In a washing apparatus, a liquid distributing tank provided with a flooring comprising a plurality of fixed slats arranged in spaced relation to provide liquid discharge openings therebetween, a plurality of movable slats disposed in the openings between the fixed slats, and means for laterally reciprocating the movable slats from side to side of the openings between the fixed slats to vary the lateral spacing between adjacent fixed and movable slats.

3. In a washing apparatus, a liquid distributing tank provided with a flooring comprising a plurality of fixed slats arranged in spaced relation to provide liquid discharge openings therebetween, a plurality of movable slats disposed in the openings between the fixed slats, and means for periodically shifting the movable slats back and forth from side to side of the openings between the fixed slats to vary the lateral spacing between adjacent fixed and movable slats.

4. In a washing apparatus, a liquid distributing tank provided with a flooring comprising a row of fixed slats arranged in spaced apart relation to provide liquid discharge openings therebetween, a plurality of movable slats disposed in alternate relation to said fixed slats in the openings therebetween, and means for periodically shifting the movable slats back and forth from side to side of the openings between the fixed slats to vary the lateral spacing between adjacent fixed and movable slats.

5. In a washing apparatus, a liquid distributing tank provided with a flooring comprising a plurality of slats arranged in a row and in spaced apart relation to provide liquid discharge openings therebetween, and means for imparting relative lateral movement between adjacent slats towards and from each other to vary the lateral spacing between them without changing the aggregate area of the discharge openings.

6. In a washing apparatus, a liquid distributing tank provided with a flooring comprising a plurality of transversely disposed slats arranged in a row in spaced apart relation to provide liquid discharge openings therebetween, certain of said slats being fixed and others being movable, and means for laterally shifting the movable slats back and forth from side to side of the openings between the fixed slats to vary the lateral spacing between adjacent fixed and movable slats.

7. In a washing apparatus, a liquid distributing tank provided with a flooring having a plurality of discharge openings therein, movable control members disposed within said openings, and means for laterally shifting the position of said control members from side to side of the openings to vary their positions therein without changing the effective discharge areas of the openings.

8. In a washing apparatus, a liquid distributing tank having a flooring comprising a plurality of obliquely disposed spaced slats arranged in a row, certain of said slats being movable relative to the others, and means for shifting said movable slats back and forth between the others to vary the lateral spacing between the movable slats and the others.

9. In a washing apparatus, a liquid distributing tank provided with a flooring comprising a plurality of obliquely disposed fixed and movable slats arranged in a row in spaced apart relation, and means for laterally reciprocating the movable slats toward and away from the fixed slats to vary the lateral spacing between adjacent fixed and movable slats.

10. In a washing apparatus, a liquid distributing tank having a flooring comprising a plurality of spaced apart obliquely disposed slats arranged in echelon, and means for laterally reciprocating certain of the slats toward and away from the others to vary the lateral clearance between the movable slats and the others.

11. In a washing apparatus, a liquid distributing tank having a flooring comprising a row of spaced slats having sharp upper edges for cutting debris, certain of said slats being fixed and others being movable, and means for laterally reciprocating said movable slats toward and away from the fixed slats to vary the lateral space between adjacent fixed and movable slats.

12. In a washing apparatus, a liquid distributing tank having a flooring comprising a plurality of obliquely disposed slats having sharp upper edges for cutting debris, said slats being arranged in a row and in spaced apart relation, and means for reciprocating certain of said slats laterally toward and away from the others to vary the lateral spacing between the movable slats and the others.

13. In a washing apparatus a liquid distributing tank having a flooring comprising a plurality of spaced apart obliquely disposed slats arranged in echelon, said slats having sharp upper edges for cutting debris, and means for laterally reciprocating certain of said slats toward and away from the others to vary the lateral clearance between the movable slats and the others.

14. In a washing apparatus, a liquid distributing tank, a plurality of transversely disposed slats in said tank arranged in spaced apart relation to provide liquid discharge openings therebetween, a movable frame in the tank, a plurality of transversely disposed slats carried by the frame and arranged in alternate relation to said first named slats in the openings therebetween, and means for reciprocating said frame to move the slats carried thereby from side to side of the openings between the others to vary the lateral spacing between adjacent slats.

FRANK H. LEWIS.